US007288769B2

(12) United States Patent
Fuchs et al.

(10) Patent No.: US 7,288,769 B2
(45) Date of Patent: Oct. 30, 2007

(54) METHOD FOR THE PRODUCTION OF AND PROTECTIVE LAYER FOR A LAYER OF LUMINESCENT MATERIAL

(75) Inventors: Manfred Fuchs, Nürnberg (DE); Peter Hackenschmied, Nuremberg (DE); Erich Hell, Gingen (DE)

(73) Assignee: Siemens Aktiengesellschaft, Munich (DE)

( * ) Notice: Subject to any disclaimer, the term of this patent is extended or adjusted under 35 U.S.C. 154(b) by 153 days.

(21) Appl. No.: 10/535,332

(22) PCT Filed: Oct. 17, 2003

(86) PCT No.: PCT/DE03/03457

§ 371 (c)(1),
(2), (4) Date: May 18, 2005

(87) PCT Pub. No.: WO2004/047121

PCT Pub. Date: Jun. 3, 2004

(65) Prior Publication Data

US 2006/0027752 A1 Feb. 9, 2006

(30) Foreign Application Priority Data

Nov. 18, 2002 (DE) ................................ 102 53 703

(51) Int. Cl.
*G01T 1/20* (2006.01)

(52) U.S. Cl. ................................ 250/361 R; 250/488.1

(58) Field of Classification Search ............ 250/361 R, 250/488.1
See application file for complete search history.

(56) References Cited

U.S. PATENT DOCUMENTS

| | | | | |
|---|---|---|---|---|
| 4,741,993 | A * | 5/1988 | Kano et al. | 430/536 |
| 2001/0055653 | A1* | 12/2001 | Dopper | 427/534 |
| 2003/0066972 | A1* | 4/2003 | Leblans et al. | 250/484.4 |

FOREIGN PATENT DOCUMENTS

| | | | |
|---|---|---|---|
| DE | 100 48 810 | A1 | 4/2002 |
| EP | 0 126 218 | A2 | 11/1984 |
| EP | 0 304 300 | B1 | 12/1992 |
| EP | 0 510 753 | B1 | 10/1996 |
| EP | 0 908 900 | A1 | 4/1999 |
| JP | 10239498 | A | 9/1998 |
| JP | 2002-174697 | | 6/2002 |

* cited by examiner

*Primary Examiner*—David Porta
*Assistant Examiner*—Shun Lee
(74) *Attorney, Agent, or Firm*—Schiff Hardin LLP

(57) ABSTRACT

A protective layer is provided for an image detector used for an x-ray image. This image detector comprises a layer of luminescent material that is to be protected against mechanical stress and moisture. A polymeric protective layer is disposed thereupon and is hardened exclusively in an area which does not border the layer of luminescent material. The hardened area provides protection against mechanical stress while the remaining area forms a moisture barrier. An appertaining method is provided for producing a polymeric protective layer on an image detector for an x-ray image, which is provided with a layer of luminescent material. The protective layer is deposited on the layer of luminescent material and then is hardened only in an area which does not border the layer of luminescent material.

13 Claims, 1 Drawing Sheet

Figure 1:
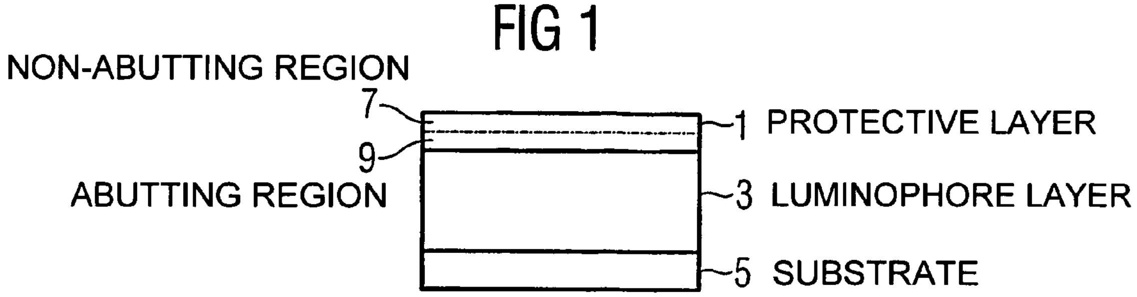

METHOD FOR THE PRODUCTION OF AND PROTECTIVE LAYER FOR A LAYER OF LUMINESCENT MATERIAL

BACKGROUND

Luminophore layers that operate as storage film (i.e., that store x-ray information) can be used for the generation of x-ray exposures. Such storage films are particularly used in digital radiography and mammography. The x-ray information is obtained by a process that begins with the body to be examined being traversed by x-ray radiation. After this irradiation, the x-ray radiation impinges on the storage film where it effects changes on storage elements integrated into the storage film. The number of the storage elements thereby set depends on the intensity of the impinging x-ray radiation. Due to the spatial distribution of the storage cells across the storage film, an x-ray exposure with the size of the exposed part of the storage film thereby results.

The storage elements of the storage film must be read out for generation of electrically-processable image data or image data visible to the human eye. The contents of the storage elements can be optically established. For readout, they are radiated with light of a specific wavelength and thereby optically excited. Such an excited storage element emits light of a specific wavelength in the event that it was charged or set beforehand via the absorption or x-ray radiation. The intensity of the emission light thereby depends on the number of set storage elements and therefore forms a measurement for the previously-absorbed x-ray radiation. The emission light is of a relatively lower intensity and is therefore measured with high-sensitivity detectors, for example, with photomultipliers.

The exposed storage film is read out pixel for pixel to generate an x-ray exposure. Electronic image data or image data perceivable by the human eye are generated from the read-out information. Due to the optical readout of the storage film, very high requirements must be placed on the uniformity of the film surface. Defects in the storage film affect not only the readout capability of the storage film, but also the capability of engaging the storage cells via x-ray radiation. They reduce the achievable image quality in both events. The achievable image quality therefore significantly depends on the freedom from defects.

Storage films are exposed to various mechanical stresses in x-ray diagnostic applications. For example, they are used in film cassettes in order to generate diagnostic x-ray exposures in medicine. Film cassettes are used in "over-table" apparatuses in which the patient to be examined is irradiation by x-ray radiation from above, with the patient lying on the cassette and exerting a two-dimensional pressure on the cassette and therewith on the storage film. The storage film is mechanically stressed.

Moreover, contact with the patient leads to the creation of moisture on the surface of the storage film, requiring the surface to be cleaned from time to time with a fluid-saturated cloth in order to remove adhering contaminants which likewise lead to the attachment of moisture. The quality of the storage film also suffers under the increase of the humidity.

"Needle image plates" (NIP), in which the luminophore is grown on a substrate in needle-shaped structures, are primarily used as storing luminophore layers. The needle tips of these structures end in the surface of the storage film and influence the x-ray sensitivity and storage capability of the film. Given support of the patient or subject to be examined on a needle image plate, the needle ends situated in the surface are mechanically stressed and can thereby be deformed. The x-ray sensitivity and the storage capability suffer under the deformation. Needle image plates therefore require a particularly effective mechanical surface protection.

From German patent document DE 100 48 810 A1, it is known to protect the surface of needle image plates in that a deformable damping layer is applied on the film surface. The damping layer thereby effects a uniform distribution of mechanical loads and must, for its part, be protected from scratches in order to not lose optical quality. For this purpose, it is proposed to apply a further cover layer made from $SiO_2$, $Al_2O_3$, $TiO_2$ or made from silicate. While the damping layer itself exhibits good bonding properties with the needle image plate, upon application of the further cover layer, bonding problems occur with the cover layer that can only be remedied via extremely elaborate production methods—if at all. Should a parylene layer (poly-para-xylylene) be used as a damping layer due to its excellent properties, this fails to achieve a sufficient bonding of the cover layer.

SUMMARY

The object of the invention is to specify a protective layer for a luminophore layer for x-ray exposures that offers excellent protection, both against mechanical loads and against humidity, exhibits a good layer bonding, and at the same time can be produced in an simple manner and cost-effectively. A further object of the invention is to specify a production method for such a protective layer.

The invention achieves these objects via an apparatus with the features of the first patent claim and via a method with the features of the sixth patent claim. A basic idea of the invention is to provide a polymer protective layer that is hardened and in fact in a region that does not abut the luminophore layer. By luminophore layer, what should thereby be understood are both storing and non-storing luminophore layers. Polymer protective layers have the advantage that, for the most part, good bonding properties with luminophore layers can be achieved. Moreover, they can be produced in an uncomplicated and cost-effective manner. Furthermore, a sufficient resilience against mechanical loads and against scratches is ensured by the hardness of the polymer. Likewise, uncomplicated and cost-effective methods are available for hardening such as, for example, electron beam hardening. Moreover, the polymer most notably forms an effective barrier against moisture in the non-hardened region. The only partially-hardened polymer protective layer therewith integrates protection against moisture and against mechanical stresses and simultaneously ensures a layer design that can be produced in a simple, durable and uncomplicated manner.

In an advantageous embodiment of the invention, the hardening of the region of the protective layer not abutting the luminophore layer ensues via electron beam treatment. Electron beam treatment is can be realized in a cost-effective and uncomplicated manner and moreover offers the advantage that the parameters of the electron beam about to which depth the irradiated layer is treated (and therewith hardened) can be set very exactly. The region of the protective layer that should not be hardened can thereby be set very exactly.

Further advantageous embodiments of the invention are the subject matter of the dependent patent claims.

DRAWINGS

Exemplary embodiments of the invention are subsequently explained using Figures.

Figure 2:
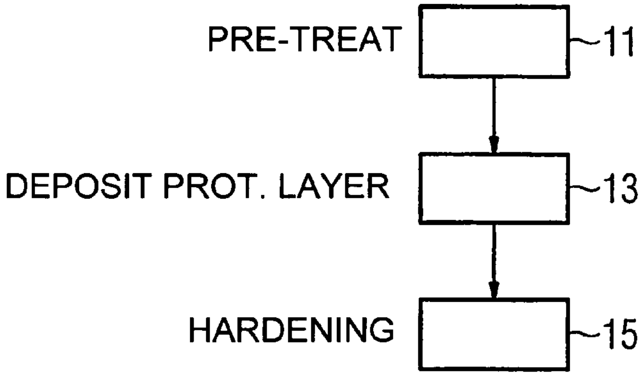

FIG. 1 is a pictorial diagram of a layer design according to an embodiment of the invention; and FIG. 2 is a flowchart illustrating production method according to the invention.

DETAILED DESCRIPTION OF THE PREFERRED EMBODIMENTS

FIG. 1 shows a layer design according to an embodiment of the invention. Shown is the protective layer 1 that lies over the luminophore layer 3. The luminophore layer 3 is applied on a substrate 5 on which it can be imprinted or vapor-deposited. It can be an arbitrary luminophore layer; in an embodiment of the invention, a needle image plate is used. For example, CsBr:Eu, RbBr:Tl or CsBr:Ga are used as storage luminophores, while CsI:Na or CsI:Ti are considered as non-storing luminophores, for example. In particular, the storage luminophores that are preferably used for needle image plates number among the alkali halogenides and can take damage via moisture.

The material of the protective layer 1 is a polymer with suitable mechanical and moisture-resistant properties. A parylene layer is preferably used that exhibits suitable protective properties and can be hardened via temperature or electron beam treatment. The three parylene types N (poly-para-xylylene), C (chlorine-poly-para-xylylene), or D (di-chlorine-poly-para-xylylene) are particularly suitable for the electron beam treatment. The thickness of the parylene layer is between approximately 8 to 80 μm. Such layers can be imprinted, spun out (a distribution of the fluid parylene via centrifugal force due to rotation), or vapor-deposited.

The protective layer 1 comprises a region 7 that does not abut on the luminophore layer 3 and a region 9 that abuts on the luminophore layer 3. The non-abutting region 7 is hardened in order to form a surface resistant against mechanical stresses or scratches.

The hardening can be achieved in a simple manner by conventional methods such as temperature or electron beam treatment. However, the temperature treatment requires temperatures of at least 200-250° C. that would lead to recrystallization of the luminophore layer 3 lying underneath.

Moreover, the temperature treatment exhibits the disadvantage that the layer depth range in which it acts cannot be set well. This is disadvantageous since the hardened region of the protective layer is more permeable to moisture than the non-hardened region. The residual of a non-hardened region of the protective layer 1 of a thickness of at least 5 μm is therefore important to achieve the protective function against moisture. Due to the better adjustability of the parameters, the region 7 not abutting on the luminophore layer 3 is therefore preferably hardened via electron beam treatment. The electron beam treatment allows the exact adjustment of the layer depth to be treated. The treated region 7 preferably exhibits a thickness of at least 3 μm in order to ensure sufficient scratch protection of the surface.

Via the hardened region 7 and the non-hardened region 9, the protective layer 1 integrates protection against mechanical stress and scratches and against moisture. At the same time, it can be applied with good layer bonding to the luminophore layer 3 underneath and represents a particularly simple (because it is one piece) layer design.

FIG. 2 shows a manufacturer method according to the invention. It is thereby assumed that the luminophore layer

3 is already present on the substrate 5. Whether it is a storing or a non-storing luminophore layer is irrelevant.

The surface of the luminophore layer 3 is pre-treated in method step 11 in order to offer good properties for the vapor deposition of the protective layer 1. The pre-treatment ensues via what is known as plasma etching in which the surface is fired upon with ions from a plasma. This plasma treatment, on the one hand, provides for a cleaning of the surface at the atomic or molecular level; on the other hand, it effects a micro-roughening of the surface that promotes a good layer bonding.

The polymer protective layer 1 is vapor-deposited in a subsequent method step 13. Pressure, spin, or evaporation methods are considered to be vapor deposition methods. A chemical vapor deposition method (CVD) is preferably used. The CVD method can if necessary be physically supported, for example, via heat (a physically enhanced CVD, PECVD method). CVD methods ensure excellent layer bonding and layer properties.

The protective layer 1 is treated by an electron beam in a subsequent method step. An electron beam of a specific energy is moved with a specific speed over the surface of the protective layer 1. The parameters of the electron beam and its movement over the protective layer influence the thickness of the region 7 of the protective layer 1 that is treated. The electron beam treatment effects a hardening of the protective layer 1 and increases its scratch resistance in a subsequent method step 15.

In a first example, a parylene layer of the type N with a total thickness of 50 μm is treated. For this, an electron beam of 40 keV is moved over the parylene layer via an electromagnetic x-y deflection. The electron beam speed is adjusted such that the uppermost 20 μm of the layer are hardened. Since a plurality of further quantities influence the depth of the treated region 7, the speed of the electron beam cannot be exactly predetermined but rather must be determined experimentally.

In a second example, a parylene layer of the type C with a total thickness of 30 μm is treated. For this, an electron beam of 25 keV is moved over the parylene layer via an electromagnetic x-y deflection so quickly that the uppermost 5 μm are hardened.

In a third example, a parylene layer of the type D with a total thickness of 20 μm is treated by an electron beam of 15 keV such that the uppermost 10 μm are hardened.

In a fourth example, a parylene layer of the type C with a total thickness of 8 μm is treated by an electron beam of 5 keV such that the uppermost 3 μm are hardened.

In addition to an electromagnetic deflection of the electron beam, for example, a mechanical feed of the layer can also be used for the movement of the electron beam relative to the protective layer.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

The invention claimed is:

1. An image detector for an x-ray image, comprising:

a luminophore layer;

a protective layer made of a polymer with a one-piece layer structure lying over the luminophore layer, the protective layer being hardened only in a region not abutting the luminophore layer.

2. The image detector according to claim 1, further comprising a non-hardened region that abuts the luminophore layer that is at least 5 μm thick.

3. The image detector according to claim 1, wherein the hardened region that does not abut the luminophore layer is at least 3 μm thick.

4. The image detector according to claim 1, wherein the hardened region of the protective layer is an electron-beam-treatment hardened region.

5. The image detector according to claim 1, wherein the protective layer is comprised of poly-para-xylylene.

6. The image detector according to claim 1, wherein the luminophore layer is a needle image plate.

7. The image detector according to claim 1, wherein the luminophore layer is comprised of alkali halogenides or alkaline earth halogenides.

8. The image detector according to claim 7, wherein the luminophore layer is comprised of CsBr:Eu, BaFBr:Eu, RbBr:TI, CsBr:Ga, CsI:Na or CsI:TI.

9. A method for producing a polymer protective layer on an image detector for an x-ray image that comprises a luminophore layer, the method comprising:

vapor-depositing the protective layer made of a polymer and having a one-piece layer structure on the luminophore layer; and hardening only a region of the protective layer that does not abut the luminophore layer.

10. The method according to claim 9, wherein a region with a thickness of at least 5 μm that abuts the luminophore layer is not hardened.

11. The method according to claim 9, wherein a region that does not abut the luminophore layer and that is hardened is at least 3 μm thick.

12. The method according to claim 9, wherein the hardening ensues via electron beam treatment.

13. The method according to claim 9, further comprising pre-treating the luminophore layer via a plasma treatment prior to the vapor-depositing of the protective layer.

* * * * *